March 10, 1925.
A. B. PRUDEN
ELECTRIC HEATING DEVICE
Filed Feb. 29, 1924
1,528,948
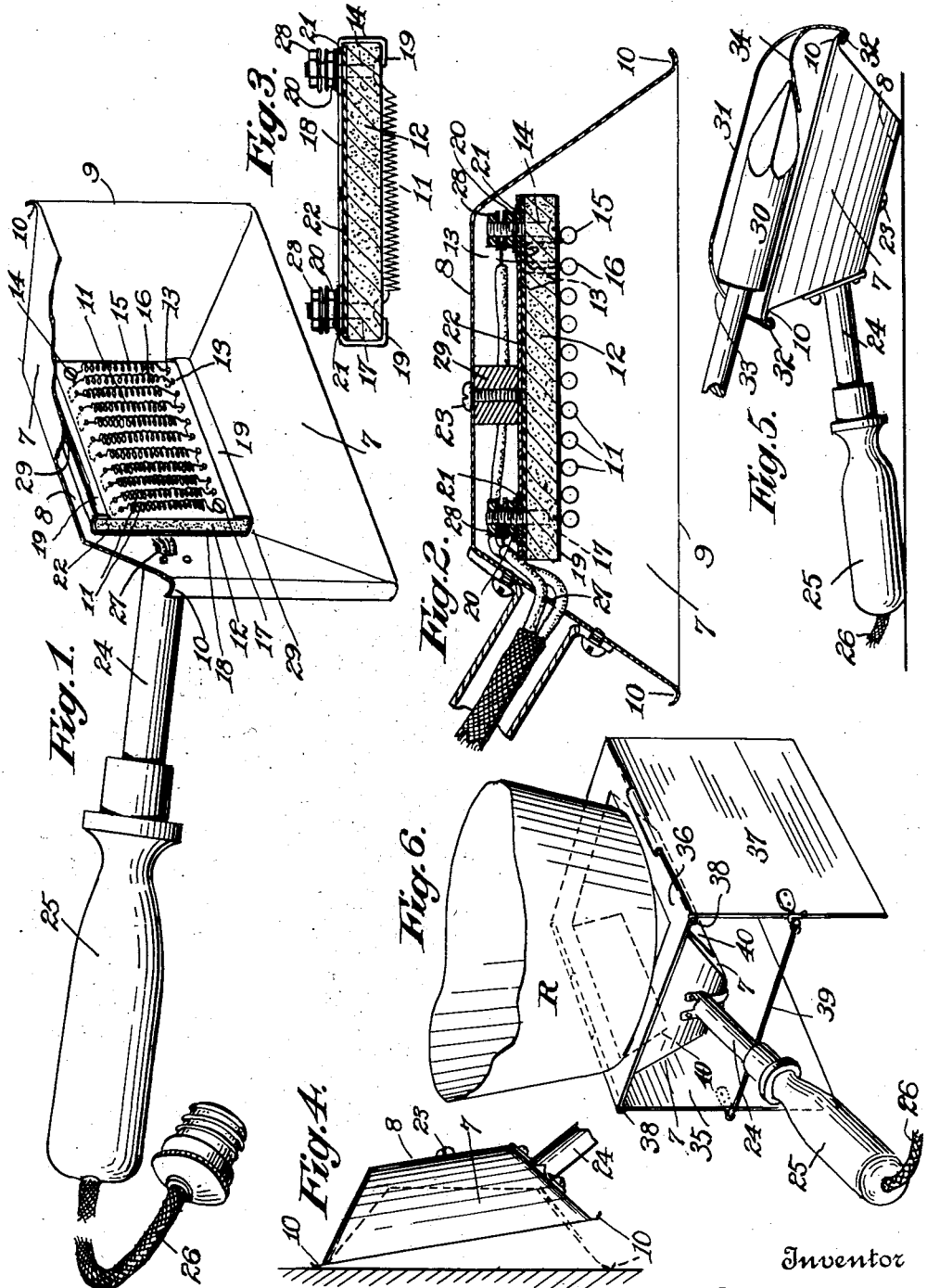
Inventor
Abraham B Pruden
By his Attorney Patented Mar. 10, 1925.

1,528,948

UNITED STATES PATENT OFFICE.

ABRAHAM B. PRUDEN, OF FLUSHING, NEW YORK.

ELECTRIC HEATING DEVICE.

Application filed February 29, 1924. Serial No. 695,888.

*To all whom it may concern:*

Be it known that I, ABRAHAM B. PRUDEN, a citizen of the United States, and a resident of Flushing, in the borough and county of Queens, city and State of New York, have invented certain new and useful Improvements in Electric Heating Devices, of which the following is a specification.

This invention relates to electric heating devices, and it is an object of the invention to provide an electric heating device particularly adapted for use to apply heat to a painted surface to facilitate the removal of the pan, and to provide a heating device of this character which is simple, compact and cheap in structure and highly efficient in use.

It is a further object of the invention to provide in a device of this character means to be detachably connected thereto to support an article, such as a soldering iron relative to the heating element to be heated thereby.

Other objects and advantages will hereinafter appear.

In carrying out the invention I provide a hood in the form of a pan preferably of rectangular shape and mount in the bottom of said hood a radiant heating element arranged as a series of parallel coils on the face of a non-conducting and heat resisting plate carried by a holder whereby it is mounted in the hood in insulated and spaced relation to the bottom thereof, said hood having a handle attached thereto arranged for the passage of electric current conductors therethrough to connect the heating element to a source of electric current supply, the handle being preferably arranged to extend substantially at a right angle to the plane of the side wall of the hood to facilitate the manipulation of the heating device.

In the drawing accompanying and forming a part of this specification Figure 1 is a perspective view looking into the hood of the device with a part of the side wall of the hood broken away to illustrate the arrangement of the heating element in the hood.

Figure 2 is a longitudinal sectional view.

Figure 3 is an end elevation of the heating element with the carrier for the heating element in section to show the arrangement of the mounting of the heating element thereon.

Figure 4 is a side elevation of the heating device showing the same in use for heating a painted surface to remove the paint therefrom.

Figure 5 is a perspective view of the heating device looking at the side and open end and showing a closure applied to the open end arranged as a holder for an article to be heated, and Figure 6 is a perspective view of the heating device applied to a support therefor to serve as a stove.

Similar characters of reference designate like parts throughout the different views of the drawing.

The embodiment of the invention illustrated in the drawing comprises a pan like hood of sheet metal having the side wall 7 diverging outward from the bottom 8 to the opening 9, the hood preferably being of rectangular shape with opposite portions at the edge, constituting the front and rear portions of the hood, curled or curved outwardly, as at 10, to facilitate the sliding or moving of the device over a flat surface.

A radiant heating element is arranged in the hood adjacent the bottom, said element comprising a coil of wire of electric current conducting and resisting material arranged as in parallel rows, as shown at 11, extending transversely of a carrier for said element, said carrier being in the form of a plate 12 of non-conducting and heat resisting material, such as asbestos. The coil is mounted on and arranged on the plate by interlacing the same through perforations 13 adjacent opposite edges of the plate. One end of the heating element or wire is secured to the plate as by a screw bolt 14 engaging in an opening at one corner of the plate, said screw bolt being in the nature of an electric terminal binding post. The coil is then strung across the face of the plate, as at 15, and passed through an opening 13 to the back of the plate, and then passed through a juxtaposed opening 13 to the front of the plate the wire of the coil being stretched so that only a strand of the wire will be at the back of the plate. The coil is passed transversely across the face of the plate, as at 16, in parallel relation to the coil portion 15, when the coil is passed through perforations 13 at the opposite edge of the plate, and this interlacing is continued until the coil portions extend in parallel relation for substantially the entire front face of the plate, as clearly shown in Figures 1 and 2. The opposite of the heating element is connected to a binding post 17 similar to post 14 engaging in an opening in the corner diagonally opposite to the post 14.

The coil carrying plate 12 is mounted in a holder 18 and whereby it is mounted in the hood, this holder comprising a sheet metal plate arranged at the back of the plate 12 and having the opposite side portions lapped around opposite edges of said plate, as at 19, to firmly secure said plate in the holder plate. The plates 12 and 18 are locked together by nuts 20 threaded onto the binding post or screws 14, 17 at the back of the holder plate, and when the holder plate is made of conducting material, the binding posts are insulated therefrom, as at 21. To insulate the connecting strands of the parallel coil portions in the rear of the coil carrying plate 12 from the carrier plate 18 a sheet of insulating material 22, such as mica, is interposed between the coil carrying and holder plates 12 and 18. The heating unit as described is removably mounted in the hood by a screw 23 passing through an opening centrally in the bottom of the hood and threaded into the holder plate 18, as clearly shown in Figure 2. By this arrangement as the screw 23 is screwed into the holder plate it will draw said plate into engagement with an interposed insulator block 29 through which the screw passes, with the binding posts out of contact with the hood.

To carry and manipulate the heating device a handle 24 is suitably attached to the hood, said handle having a hand grip 25 of non-conducting material, such as wood. This handle is tubular for the passage of electric current conductors 26 to connect the heating element to a source of electric current supply, said conductors passing through an opening in the side wall of the hood, as at 27, with one conductor electrically connected to the binding post 17 and the other conductor connected to the binding post 14 by nuts 28, In the use of a heating device to heat a paint coated surface to cause said paint to blister to remove the same, as by a scraper or putty knife, the curled or curved edge 10 at either the forward or rear portion of the hood is placed into engagement with the painted surface and moved or slid thereover, this being facilitated by the curled edge, as shown in Figure 4 where the forward edge of the hood is shown in engagement with the surface with the rear edge raised therefrom. If desired the hood may be placed against such surface with the entire edge portion of the opening in engagement therewith, as shown in dotted lines in Figure 4. The handle is preferably arranged so that it extends at substantially a right angle to the diverging side wall of the hood which still further facilitates the manipulating of the heating device.

To adapt the device as a heater for an article, such as a soldering iron 30 (Figure 5) a closure 31 is provided for the opening of the hood. This closure is in the nature of a pan having a cross sectional area and shaped to conform to the hood, the opposite edges of the side wall at the opening being curled or curved inward for slidable engagement with the curled portions 10 of the hood as shown at 32, whereby it is detachably connected to the hood. This closure is arranged with an opening 33 for the insertion of the article to be heated and has a portion stamped from the opposite end and bent inwardly, as shown at 34, to serve to support an article relative to but out of contact with the heating element and in position to be heated by the latter. In this use of the heating device it is supported from the bottom and handle as shown in Figure 5.

To adapt the heating device as a stove for heating water or the like in a receptacle, I provide a stand which is preferably collapsible or foldable and comprising plates 35, 36 and 37 hingedly connected, as at 38, the plates 35 and 37 constituting supports for the plate 36. The plates are retained in unfolded condition by hooks 39 pivotally connected at one end to the plate 35 and the opposite end engaging over a pin in the plate 37. The intermediate or top plate has portions stamped therefrom and bent laterally to converge toward each other, as at 40, thereby providing an opening in the plate and the stamped portions 40 serving as a support for the heating device, as clearly shown in Figure 6. In its unfolded condition as shown in the drawing a receptacle R may be placed upon the plate 36 over the opening therein and the heat generated and radiated by the heating coil will be direct and impinge directly against the bottom of the receptacle.

Having thus described my invention I claim:

1. In an electric heating device, a hood, a radiant heating element, a carrier of heat and electric current insulating material for said heating element and whereby said element is mounted in and exposed to the interior of the hood, and a handle attached to said hood.

2. In an electric heating device, a hood, a radiant heating element comprising a series of coils of resistance material, a plate of insulating material to carry said coils on the exterior thereof arranged with binding posts for connection with a source of current supply and electrically connected to the heating element and means to mount the plate with the heating element in the hood.

3. In an electric heating device, a pan like hood the side wall of which diverges outwardly from the bottom, a radiant heating element comprising a series of parallelly arranged and electrically connected coils of resistance material, a plate of electric current and heat insulating material upon which said element is mounted with the coils extending transversely of one face, terminal binding posts arranged in said material for connection to a source of current supply and to which the heating element is electrically connected, and means to mount the carrier plate adjacent the bottom of the hood with the heating element exposed to the interior of the hood.

4. In an electric heating device, a pan like hood the side wall of which diverges outwardly, a radiant heating element mounted upon and insulated from the bottom of the hood and exposed to the interior of the hood, and a tubular handle attached to the hood and through which handle electric current conductors for connecting the heating element to a source of current supply are adapted to extend.

5. In an electric heating device, a pan like hood of rectangular shape in cross section with the side walls diverging outwardly from the bottom, a radiant heating element mounted in the pan adjacent the bottom comprising a plate of non-conducting and heat insulating material, a series of coils of current resisting material mounted upon said plate in parallel relation upon one face thereof, a carrier for said plate with the coils and whereby to mount the heating element in the hood, and terminal binding posts carried at the side of the carrier opposite to the coils and insulated from the carrier, said coils being electrically connected to the posts and said posts adapted for connection of current conductors to connect the heating element with a source of electricity.

6. In an electric heating device, a pan like hood, and a radiant heating element mounted in the bottom of said hood comprising a plate of non-conducting and heat resisting material, a coil of electric current conducting and resistance material, said coil being arranged on one face of the plate in parallel rows by interlacing the coil through perforations adjacent opposite edges of the plate, a plate of insulating material juxtaposed to the back of the plate with the connecting portion of the coils at the back of the first plate interposed between the two plates, a metallic plate juxtaposed to said latter insulator plate with the lateral edges lapped over the opposite edges of the two insulator plates and by means of which plate the heating element is mounted in the hood, and terminal binding posts passing through said plates and insulated from the metallic plate to which the coil is electrically connected and adapted for connection of current conductors to connect the heating element to a source of current supply.

7. In an electric heating device, a pan like hood having opposite edge portions of the wall bent laterally, a radiant heating element mounted upon and insulated from the bottom of the hood, a handle attached to the hood to carry and manipulate the same, and means arranged for detachable connection to the laterally bent wall portions of the hood to extend across the opening of the hood and support an article thereby to be heated by the heating element.

8. In an electric heating device, a pan like hood, a radiant heating element mounted upon and insulated from the bottom of the hood, a handle attached to the hood to carry and manipulate the same, and a pan-like closure for the opening of the hood arranged for the insertion of an article therein and to support the same to be heated by the heating element, said closure and hood being arranged to be detachably connected.

9. In an electric heating device, a pan like hood of rectangular shape in cross section with the edge portions of a pair of the opposite side walls curled outward, a radiant heating element mounted upon and insulated from the bottom of the hood, a handle attached to the hood to carry and manipulate the heating device, and a pan-like closure for the opening of the hood arranged for slidable connection with the curled portion thereof to detachably connect the two together and arranged to support an article in relation to the heating element to be heated thereby.

Signed at New York city, in the county of New York and State of New York, this 23rd day of February, 1924.

ABRAHAM B. PRUDEN.